(12) United States Patent
Sachs et al.

(10) Patent No.: US 9,346,385 B2
(45) Date of Patent: May 24, 2016

(54) VEHICLE SEATING ASSEMBLY WITH MULTI-CONTOUR SYSTEM

(71) Applicant: Ford Global Technologies, LLC, Dearborn, MI (US)

(72) Inventors: Adam Sachs, Oak Park, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 14/196,145

(22) Filed: Mar. 4, 2014

(65) Prior Publication Data

US 2015/0251580 A1 Sep. 10, 2015

(51) Int. Cl.
| | |
|---|---|
| *A47C 4/54* | (2006.01) |
| *B60N 2/64* | (2006.01) |
| *A61H 9/00* | (2006.01) |
| *A61H 23/02* | (2006.01) |
| *B60N 2/44* | (2006.01) |
| *B60N 2/56* | (2006.01) |

(52) U.S. Cl.
CPC .............. *B60N 2/646* (2013.01); *A61H 9/0078* (2013.01); *A61H 23/02* (2013.01); *B60N 2/448* (2013.01); *B60N 2/4415* (2013.01); *B60N 2/565* (2013.01); *B60N 2/5657* (2013.01); *B60N 2/643* (2013.01); *A61H 2201/1207* (2013.01); *A61H 2201/164* (2013.01); *A61H 2201/1623* (2013.01); *A61H 2205/081* (2013.01); *A61H 2205/108* (2013.01); *B60N 2002/4425* (2013.01)

(58) Field of Classification Search
CPC ................................ A47C 7/467; B60N 2/646
USPC ......... 297/284.1, 284.2, 284.3, 284.6, 216.13
See application file for complete search history.

(56) References Cited

U.S. PATENT DOCUMENTS

| | | | | |
|---|---|---|---|---|
| 5,769,489 | A * | 6/1998 | Dellanno ................. | 297/216.14 |
| 7,264,271 | B2 * | 9/2007 | Barvosa-Carter et al. .... | 280/751 |
| 7,448,678 | B2 * | 11/2008 | Browne et al. ........... | 297/216.12 |
| 7,556,313 | B2 * | 7/2009 | Browne et al. ........... | 297/216.12 |
| 7,712,832 | B2 * | 5/2010 | Booth et al. ................ | 297/284.9 |
| 7,758,121 | B2 * | 7/2010 | Browne et al. ........... | 297/284.11 |
| 7,883,148 | B2 | 2/2011 | Alexander et al. | |
| 2005/0253425 | A1 * | 11/2005 | Asada et al. ................ | 297/180.1 |
| 2007/0246979 | A1 * | 10/2007 | Browne et al. ........... | 297/216.12 |

\* cited by examiner

*Primary Examiner* — Laurie K Cranmer
(74) *Attorney, Agent, or Firm* — Vichit Chea; Price Heneveld LLP

(57) ABSTRACT

A vehicle seating assembly includes a seating surface. A plurality of polymeric mats each include a memory metal encased therein, a first side operably coupled with an underlying support structure, and a second side proximate the seating surface. An electrical source is operably coupled to the memory metal in each polymeric mat and is configured to supply energy to the plurality of memory metals in each polymeric mat. A controller is in communication with the plurality of polymeric mats and is configured to deliver a predetermined electrical input to the memory metal of each polymeric mat. The predetermined electrical input manipulates each polymeric mat to a deformed state, which operates a cushion between a multitude of comfort positions. An air bladder is disposed below the plurality of polymeric mats. The air bladder is operable between an inflated condition and a deflated condition.

15 Claims, 5 Drawing Sheets

VEHICLE SEATING ASSEMBLY WITH MULTI-CONTOUR SYSTEM

FIELD

The present disclosure generally relates to a vehicle seating assembly, and more particularly to a vehicle seating assembly having a multi-contour system with a massage function using shape-memory alloy.

BACKGROUND

Seating assemblies for vehicles are progressively developing to be more adapted for occupant comfort in a variety of environments and for a number of driver and passenger preferences. With this, the number of occupant comfort features that frequently require user interaction and actuation have similarly increased. Occasionally, modern vehicle seating assemblies are equipped with massaging capabilities that have a variety of massage settings and types. Accordingly, methods and systems to accommodate the different occupant comfort features and desired settings for drivers and passengers, as well as the desired massage settings and types, has become increasingly more important.

SUMMARY

According to one aspect of the present disclosure, a vehicle seating assembly includes a vehicle seating assembly having a seating surface. A plurality of polymeric mats each include a memory metal encased therein. Each polymeric mat includes a first side operably coupled with an underlying support structure and a second side proximate the seating surface. An electrical source is operably coupled to the memory metal in each polymeric mat and is configured to supply energy to the plurality of memory metals in each polymeric mat. A controller is in communication with the plurality of polymeric mats and is configured to deliver a predetermined electrical input to the memory metal of each polymeric mat. The predetermined electrical input manipulates each polymeric mat to a deformed state. Deformation of the plurality of polymeric mats to the deformed state operates a cushion between a multitude of comfort positions. An air bladder is disposed below the plurality of polymeric mats. The air bladder is operable between an inflated condition and a deflated condition.

According to another aspect of the present disclosure, a vehicle seating assembly includes a cushion. A multi-contour pad includes multiple polymeric mats, each including a memory metal coupled with an electrical source. A controller is coupled with the memory metal in each polymeric mat. The controller is configured to apply energy to the memory metal to deform the polymeric mat, causing movement of the cushion to a comfort position. An air bladder is operable between inflated and deflated conditions and is disposed below the polymeric mats.

According to yet another aspect of the present disclosure, a vehicle seating assembly includes a cushion. A multi-contour pad includes a plurality of memory metals coupled with an electrical source. A controller is coupled with the electrical source of each polymeric mat. The controller is configured to apply energy to the memory metal to deform the multi-contour pad, causing movement of the cushion to a comfort position. An air bladder is disposed below the polymeric mats.

According to still another aspect of the present disclosure, a vehicle seating assembly includes a carrier configured to support an air bladder and a polymeric mat. The polymeric mat includes a memory metal encased therein, configured to move between a normal state and a deformed state. A foam layer is disposed above the polymeric mat and a climate control layer is supported over the foam layer. A comfort pad is disposed on top of the climate control layer and a coverstock is disposed on a top portion of the comfort pad. The construction of the vehicle seating assembly provides a comfortable seating arrangement for a passenger of a vehicle that can be moved and manipulated to fit the comfort level of a passenger, and at the same time provide massaging movement to relax the passenger during travel.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
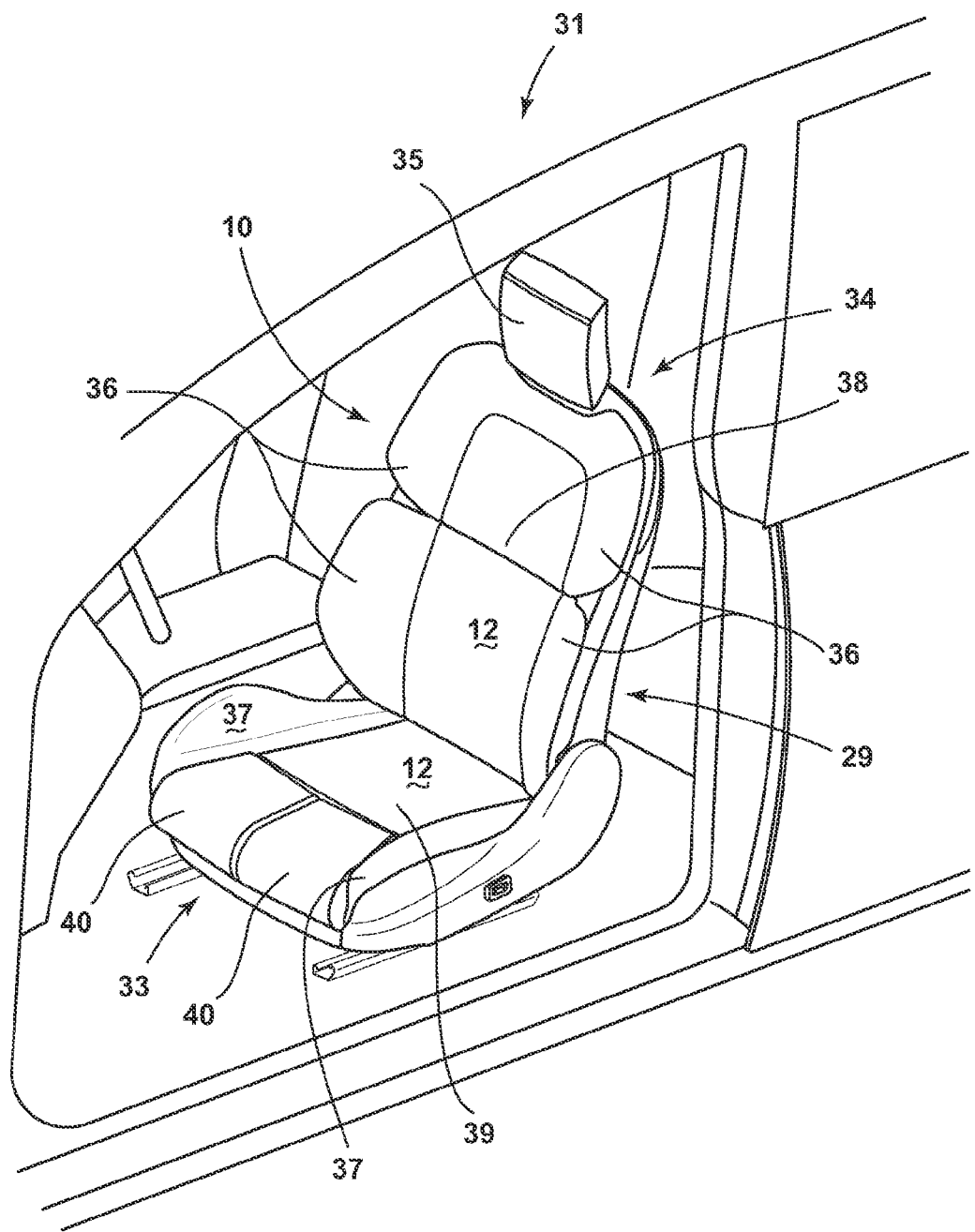
FIG. 1 is a front perspective view of one embodiment of a vehicle seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiments shown in FIGS. 1-6, reference numeral 10 generally designates a vehicle seating assembly having a seating surface 12. A plurality of polymeric mats 14 each include a memory metal 16 encased therein. Each polymeric mat 14 includes a first side 18 operably coupled with a carrier or underlying support structure 20 and a second side 22 proximate the seating surface 12. An electrical source 24 is operably coupled to the memory metal 16 in each polymeric mat 14 and is configured to supply energy to the plurality of memory metals 16 in each polymeric mat 14. A controller 26 is in communication with the plurality of polymeric mats 14 and is configured to deliver a predetermined electrical input to the memory metal 16 of each polymeric mat 14. The predetermined electrical input manipulates each polymeric mat 14 to a deformed state. Deformation of the plurality of polymeric mats 14 to the deformed state operates a cushion assembly 30 between a multitude of comfort positions. An air bladder 32 is disposed below the plurality of polymeric mats 14. The air bladder 32 is operable between an inflated condition and a deflated condition.

Referring again to FIG. 1, the vehicle seating assembly 10 of the present disclosure is configured for positioning in a vehicle 31. In the illustrated embodiment of FIG. 1, the vehicle seating assembly 10 is positioned in a driver's seat 34. However, it will be understood that the vehicle seating assembly 10 may be utilized on the driver seat 34, a front passenger seat, or a rear passenger seat of the vehicle 31 in a seatback 29 or a seat 33. In addition, it will be understood that various components of the vehicle seating assembly 10 may incorporate the polymeric mats 14 as set forth herein. Specifically, the polymeric mats 14 may be disposed in a head restraint 35, seatback side bolsters 36, seat side bolsters 37, a center area seatback 38, or a center seat area 39. In addition, the polymeric mats 14 may also be disposed in independent thigh supports 40 provided on a forward portion the vehicle seating assembly 10. The vehicle seating assembly 10 is supported over rails disposed inside the vehicle and is also operably coupled with an electrical connection and a data connection, such that information may be viewable by an in-vehicle information screen.

Figure 2:
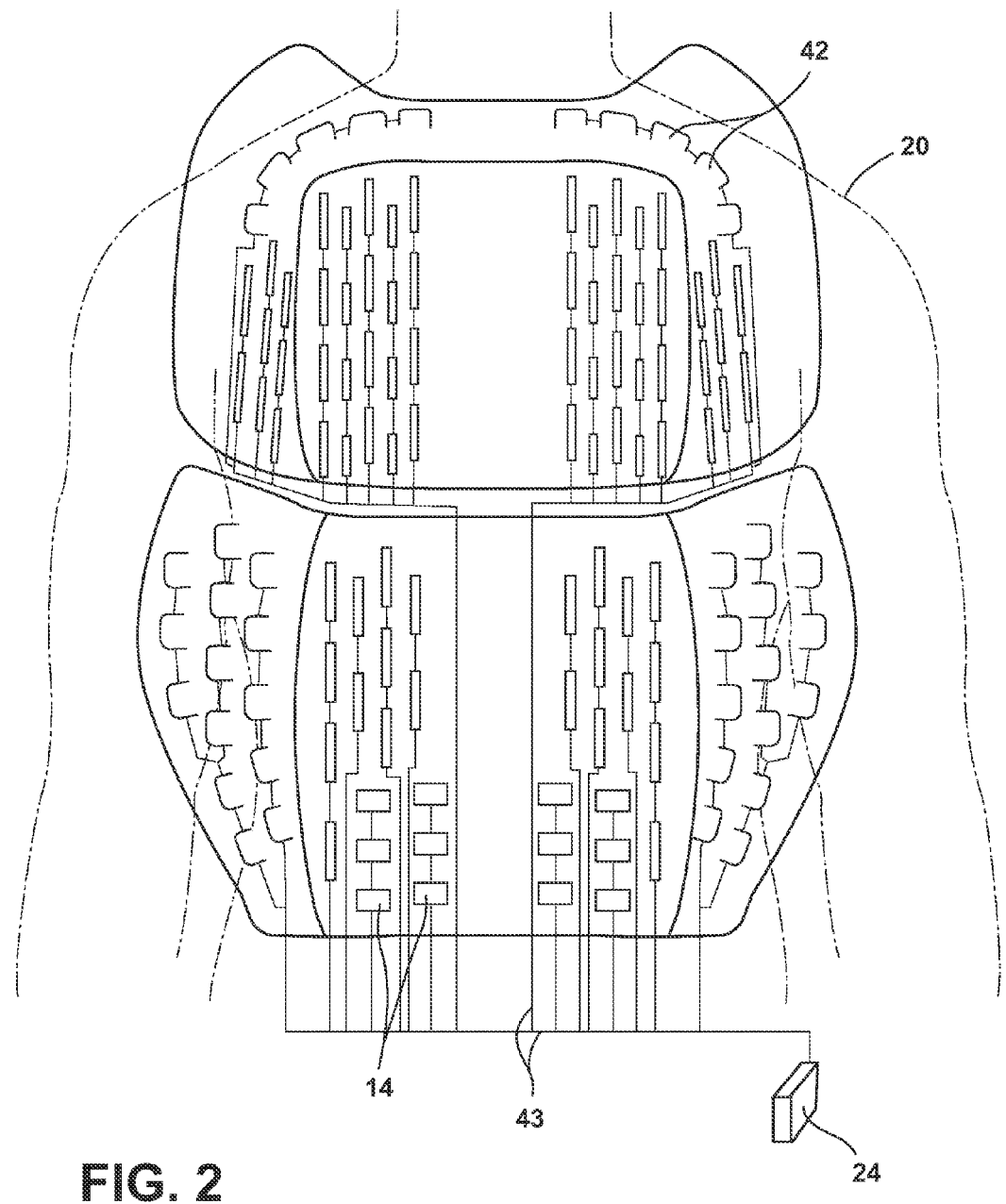
FIG. 2 is a front elevational view of one embodiment of a vehicle seatback of the vehicle seating assembly of FIG. 1.

Referring now to FIG. 2, the polymeric mats 14 may take on a variety of constructions and configurations. Specifically, as shown in FIG. 2, an upper portion of the seatback 29 proximate the clavicles of a passenger includes U-shaped tabs 42 having polymeric mats 14 that arc the U-shaped tabs 42 outward. An upper middle back portion includes elongate polymeric mats 14 configured to provide more acute support or massaging to the upper back of a passenger. A middle back region of the seatback 29 includes thicker strips configured for broader and more robust support and massaging of the back of a passenger, and a lower back portion of the seatback 29 includes polymeric mats 14 that have a more square-like construction and which provide even deeper and stronger support massaging. All of the polymeric mats 14 are operably and electrically coupled with the electrical source 24, which is controlled by the controller 26. Lines 43 connect the polymeric mats 14 with the memory metal 16 in each of the polymeric mats 14. The seat 33 includes generally uniform polymeric mats 14. However, it is contemplated that the polymeric mats 14 could be of different shapes and sizes, depending on the comfort needs of the passenger.

The polymeric mats 14 may be connected in parallel or in series and may function uniformly or separately. The controller 26 can systematically apply an electrical signal to a single polymeric mat 14, a group of polymeric mats 14, or all of the polymeric mats 14, based on the desired preferences of a user. Further, particular groups of polymeric mats 14 may be activated by the controller 26 to provide a wide range of adjustments in the vehicle seating assembly 10. Still further, the controller 26 may be configured to apply pulsed electrical signals to the polymeric mats 14, and more specifically to the memory metals 16, thereby providing a massaging feel to a passenger. It will be understood that variations in the magnitude, rate, or both of the electrical signal sent by the controller 26 will influence the degree of deformation and the rate of deformation of the memory metals 16, and consequently the polymeric mats 14. The high level of versatility in the system allows for customization by passengers of personal seating preferences. Further, as noted herein, the polymeric mats 14 may be activated systematically to create a wave-like formation along the seating surface 12. The introduction of the air bladder 32 under the polymeric mats 14 allows for a smoother and a more continuous wave-like motion across the seating surface 12, resulting in a more comfortable massage than with memory metals 16 acting alone. Further, the introduction of the air bladder 32 provides for a more blunt or even massage across the seating surface 12, minimizing the likelihood of pointed or concentrated forces applied to the seating surface 12, and consequently a seated passenger.

Figure 3:
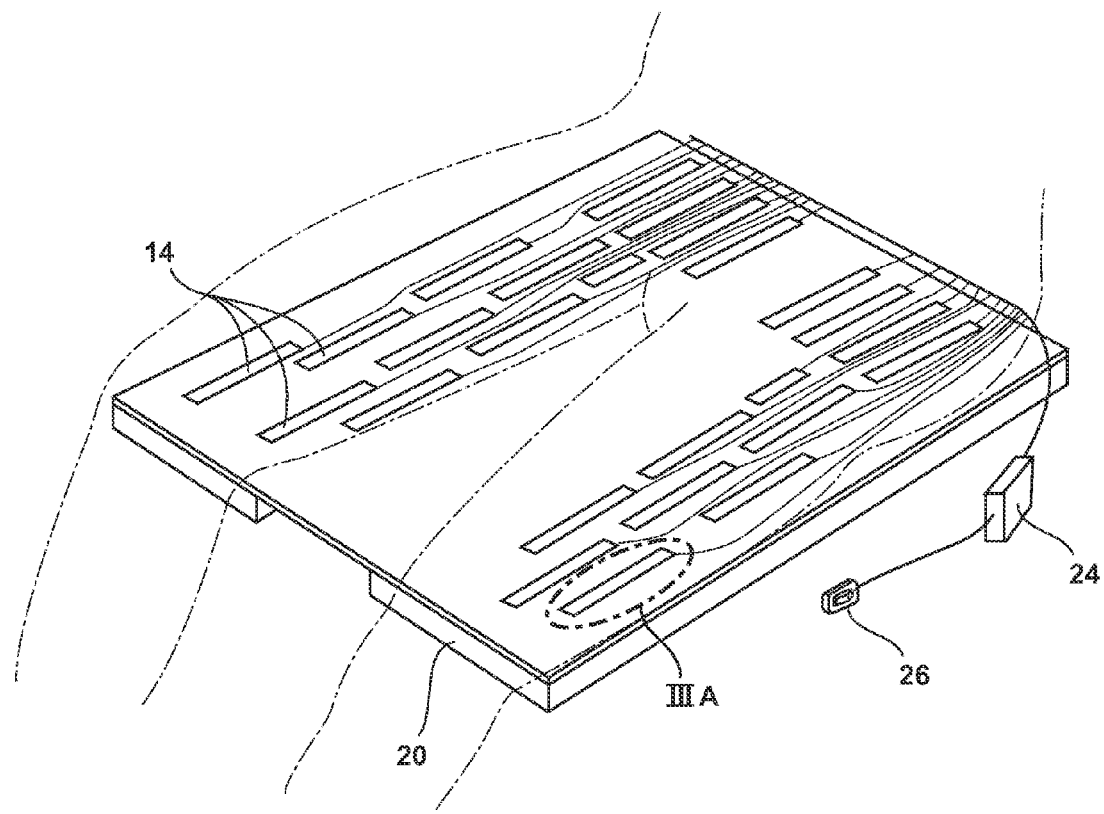
FIG. 3 is a top perspective view of one embodiment of a vehicle seat of the vehicle seating assembly of FIG. 1.
Figure 3A:
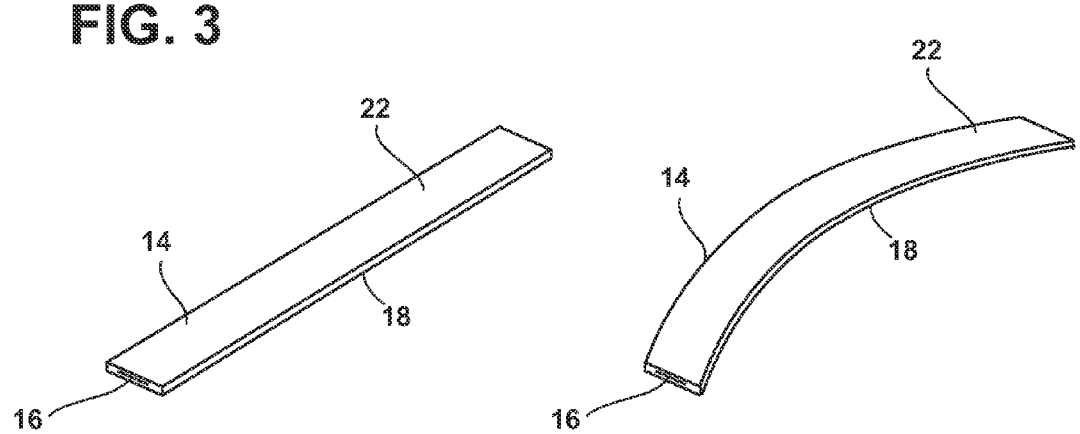
FIG. 3A is a top perspective view of one embodiment of a polymeric mat of the vehicle seating assembly in a normal state.
Figure 3B:
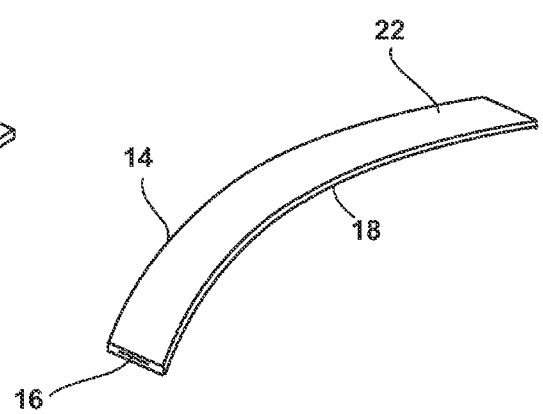
FIG. 3B is a top perspective view of the polymeric mat of FIG. 3A in a deformed state.

With reference to FIGS. 3-3B, each of the polymeric mats 14 includes an elongate construction with the memory metal 16 disposed therein. The polymeric mat 14 may be any of a variety of flexible or rubber-type plastics that are easily flexed with repetition and without fatigue. FIG. 3A illustrates the polymeric mat 14 in a normal state. FIG. 3B illustrates the polymeric mat 14 in a deformed state after a charge is applied from the electrical source 24. It is also contemplated that the electrical source 24 may provide an electrical input signal that results in heat being distributed to the polymeric mats 14, which is relayed to each of the polymeric mats 14, the applied heat resulting in deformation of the memory metal 16. More specifically, the memory metals 16 may include alloy compositions that are capable of multiple temperature dependent phases. The temperatures at which the memory metals 16 are deformed may vary, depending on the application. It is contemplated that the shape of the memory metals 16 and recovery of the memory metals 16 back to a non-deformed state can occur over a range of a few degrees, or alternatively have a more gradual shifting into deformation over a wider temperature range. It is contemplated that the initiation and completion of the transformation of the memory metals 16, and consequently the polymeric mats 14, can be controlled to within a few degrees, depending on the desired application and the particular alloy used in the memory metals 16. It is generally contemplated that the mechanical properties of the memory metals 16 allow for exceptional variance in the shape between the non-deformed state and the deformed state of the memory metals 16, and consequently the polymeric mats 14.

Figure 4:
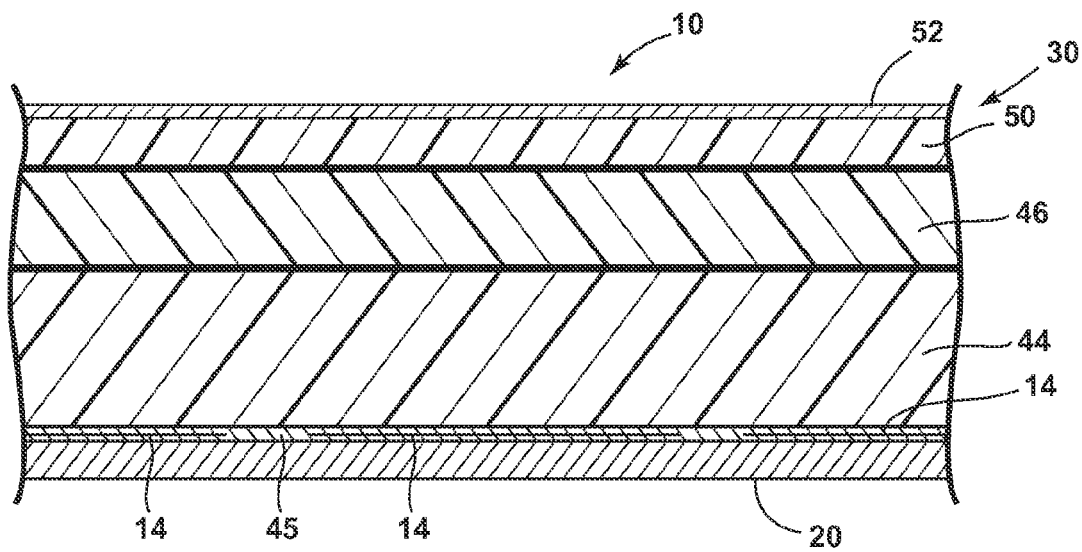
FIG. 4 is a cross-sectional schematic view of a cushion assembly of the vehicle seating assembly of the present disclosure with a polymeric mat in a normal state.
Figure 5:
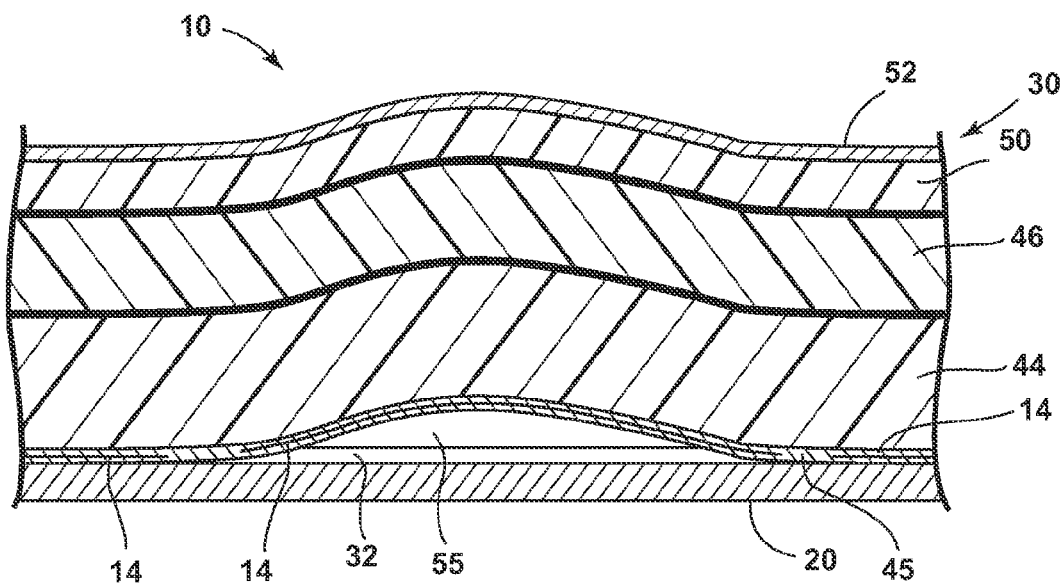
FIG. 5 is a cross-sectional schematic view of another embodiment of the cushion assembly of the vehicle seating assembly of the present disclosure with a polymeric mat in a deformed state.
Figure 6:
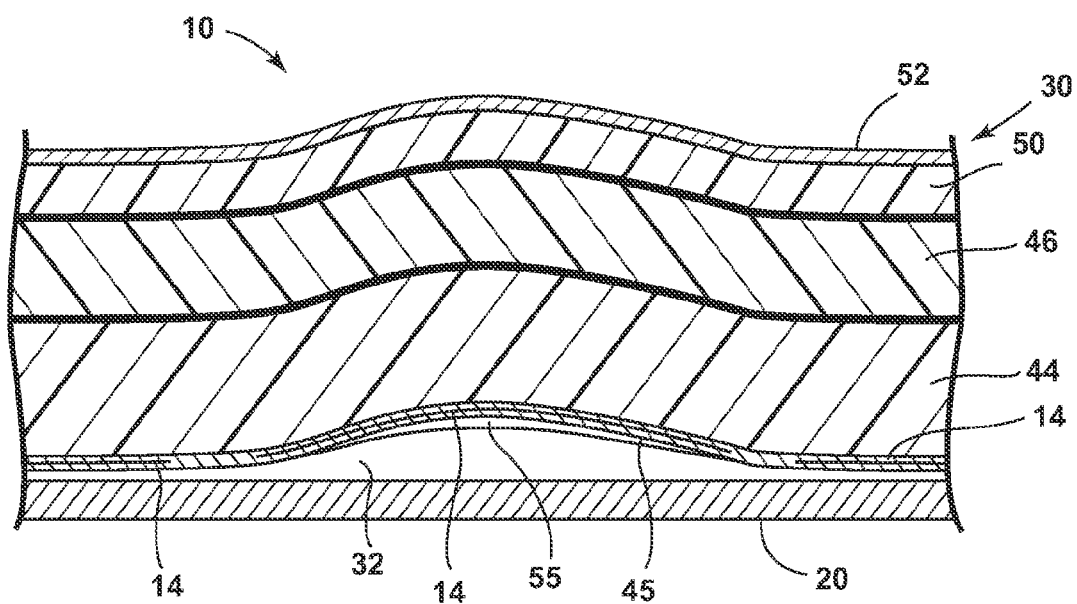
FIG. 6 is a cross-sectional schematic view of another embodiment of the cushion assembly of the vehicle seating assembly of the present disclosure with a polymeric mat in a deformed state and an air bladder inflated.

With reference now to FIGS. 4-6, the construction of the vehicle seating assembly 10 is illustrated in cross-section. The vehicle seating assembly 10 includes a foam material layer 44 that overlies the polymeric mats 14 that are formed in a single multi-contour pad 45. The foam material layer 44 may be any of a variety of open or closed cell foam materials that provide support and comfort to a passenger. A climate control layer 46 is provided above the foam material layer 44 and is used to provide climate comfort to the posterior and back of a passenger. The climate control layer 46 is configured to blow air or draw air from the seating surface 12 to heat or cool a seated passenger. A comfort pad 50 is disposed above the climate control layer 46 and includes an open cell and permeable construction that allows for the drawing or blowing of air through the comfort pad 50 from the climate control layer 46. Finally, a coverstock material 52 is disposed above the comfort pad 50. The comfort pad 50 acts as a transitional layer between the coverstock material 52 and the climate control layer 46. The coverstock material 52 may include perforated leather or another type of fabric that is permeable to allow for ventilation of the seating surface 12. The entire vehicle seating assembly 10 is disposed on the carrier or underlying support structure 20 that supports the cushion assembly 30 in position on the vehicle seating assembly 10.

Referring now specifically to FIG. 5, upon actuation of the electrical source 24 by a user operating the controller 26, the memory metal 16 transitions from a normal state to a deformed state, arcing upwardly. Consequently, the polymeric mat 14 flexes upwardly, thereby creating a small rise in the coverstock material 52 through the foam material layer 44, the climate control layer 46, and the comfort pad 50 layer to define a small gap 55. The arcuate nature of the deformed polymeric mat 14 can be applied gradually or instantly. In addition, as a result of the alignment of the various polymeric mats 14 in any portion of the seat 33 or the seatback 29, the polymeric mats 14 may be rolled across the seat 33 to provide a massaging effect to a passenger.

With reference now to FIG. 6, in yet another embodiment, the air bladder 32 is disposed below the polymeric mat 14 and allows for additional fluidity in movement of the polymeric mat 14 between the normal state and the deformed state. The polymeric mat 14 creates a rolling or wave-like condition as the polymeric mats 14 are moved to the deformed state across the vehicle seating assembly 10. As the polymeric mats 14 create a rolling or wave-like motion systematically across the vehicle seating assembly 10, undulations are formed in the air bladder 32, resulting in a smooth apparent transition of the memory metals 16 from the non-deformed state to the deformed state. At the same time, the foam material layer 44, the climate control layer 46, and the comfort pad 50 layer are rolled, resulting in the coverstock material 52 applying pressure to a passenger. As noted above, the pressure may provide additional support to any portion of the buttocks or back of a passenger, or alternatively, may be used to massage the passenger during travel and to increase circulation to the extremities of a passenger during long travel.

The disclosure set forth herein describes a vehicle seating assembly that utilizes memory metals that are formed in polymeric mats that when used in conjunction with an air bladder provide an even and smooth contouring of the vehicle seating assembly to a desired comfort level of a passenger, or alternatively by a massaging movement in portions of a seating surface. It is contemplated that the air pressure in the air bladder can be modified by a passenger to increase or decrease the amount of acute pressure applied by the polymeric mats disposed in the vehicle seating assembly. As noted herein, the use of an air bladder in conjunction with the memory metals can provide for a wave-like motion across the vehicle seating assembly that is smooth and can increase the comfort level of a passenger during long travel.

It will also be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:
1. A vehicle seating assembly comprising:
 a seating surface;
 a plurality of polymeric mats, each including a memory metal encased therein, each polymeric mat having a first side operably coupled with an underlying support structure and a second side proximate the seating surface;
 an electrical source operably coupled to the memory metal in each polymeric mat and configured to supply energy to the memory metal in each polymeric mat;
 a controller in communication with the plurality of polymeric mats and configured to deliver a predetermined electrical input to the memory metal of each polymeric mat, wherein the predetermined electrical input manipulates each polymeric mat to a deformed state, and wherein deformation of the plurality of polymeric mats to the deformed state operates a cushion assembly between a multitude of comfort positions; and
 an air bladder disposed below the plurality of polymeric mats, the air bladder being operable between an inflated condition and a deflated condition, wherein the plurality of polymeric mats are configured to move into an arched position when in the deformed state and wherein the air bladder is configured to form undulations corresponding to each of the plurality of polymeric mats.

2. The vehicle seating assembly of claim 1, wherein each of the multitude of comfort positions are determined by the predetermined electrical input delivered to the memory metal of each polymeric mat.

3. The vehicle seating assembly of claim 1, wherein the predetermined electrical input effects a temperature-related shape change to the plurality of polymeric mats corresponding with the plurality of polymeric mats being manipulated to the deformed state.

4. The vehicle seating assembly of claim 1, wherein the seating surface is disposed on a seatback that includes at least one of the plurality of memory metals, and wherein deformation of the polymeric mat of each of the plurality of memory metals to the deformed state operates an outer surface of the cushion assembly between a plurality of back comfort positions.

5. The vehicle seating assembly of claim 1, wherein the plurality of polymeric mats are configured to move in a wave-like motion across the seating surface and wherein the air bladder is configured to form undulations corresponding to the wave-like motion of the plurality of polymeric mats.

6. The vehicle seating assembly of claim 1, wherein the plurality of polymeric mats are integrally formed into a single multi-contour pad.

7. The vehicle seating assembly of claim 6, wherein the single multi-contour pad is covered by a foam layer, a climate control layer, and a coverstock material.

8. A vehicle seating assembly comprising:
  a cushion;
  a multi-contour pad including multiple polymeric mats, each including a memory metal coupled with an electrical source;
  a controller coupled with the memory metal in each polymeric mat, the controller configured to apply energy to the memory metal to deform the polymeric mat, causing movement of the cushion to a comfort position; and
  an air bladder operable between inflated and deflated conditions and disposed below the polymeric mats, wherein the polymeric mats are integrally formed into a single multi-contour pad that is covered by a foam layer, a climate control layer, and a coverstock material.

9. The vehicle seating assembly of claim 8, wherein the comfort positions are determined by a predetermined electrical input delivered to one or more of the memory metals.

10. The vehicle seating assembly of claim 8, wherein the predetermined electrical input affects a temperature-related shape change to the polymeric mat corresponding with the polymeric mat being manipulated to a deformed state.

11. The vehicle seating assembly of claim 8, wherein the seating surface is disposed on a seatback that includes at least one of the memory metals, and wherein deformation of the polymeric mat of each of the memory metals to the deformed state operates an outer surface of the cushion between a plurality of back comfort positions.

12. The vehicle seating assembly of claim 11, wherein the polymeric mats are configured to move in a wave-like motion across the seating surface, and wherein the air bladder is configured to form undulations corresponding to the wave-like motion of the polymeric mats.

13. The vehicle seating assembly of claim 8, wherein the polymeric mats are configured to move into an arched position when in a deformed state, and wherein the air bladder is configured to form undulations corresponding to each polymeric mat.

14. A vehicle seating assembly comprising:
  a cushion including a plurality of memory metals coupled with an electrical source;
  a controller coupled with the electrical source that applies energy to and consequently arches the plurality of memory metals to form undulations in a wave-like motion across a seating surface of the cushion; and
  an air bladder disposed below the plurality of memory metals and that forms undulations corresponding to the plurality of memory metals.

15. The vehicle seating assembly of claim 14, wherein the plurality of memory metals is covered by a foam layer, a climate control layer, and a coverstock material.

* * * * *